(12) United States Patent
Broom et al.

(10) Patent No.: US 6,405,914 B1
(45) Date of Patent: Jun. 18, 2002

(54) VACUUM CONVEYOR

(75) Inventors: Allan Broom, Coquitlam; George Kutak-Petrik, Port Coquitlam, both of (CA)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/599,538

(22) Filed: Jun. 23, 2000

(30) Foreign Application Priority Data

Jun. 25, 1999 (DE) .................................... 299 10 850 U

(51) Int. Cl.[7] ............................................. B65H 20/00
(52) U.S. Cl. ........................................ 226/95; 226/170
(58) Field of Search ............................ 226/91, 95, 170

(56) References Cited

U.S. PATENT DOCUMENTS

| | | | | |
|---|---|---|---|---|
| 3,425,610 A | * | 2/1969 | Stewart ........................ | 226/95 |
| 4,022,366 A | | 5/1977 | Rooney | |
| 4,295,737 A | * | 10/1981 | Silverberg ................. | 226/95 X |
| 4,298,277 A | * | 11/1981 | Silverberg ................. | 226/95 X |
| 4,336,813 A | * | 6/1982 | Seragnoli ................... | 226/95 X |
| 4,481,066 A | * | 11/1984 | Hirakawa et al. .......... | 226/95 X |
| 4,641,771 A | * | 2/1987 | Masuch et al. ............ | 226/95 X |
| 4,660,752 A | * | 4/1987 | Rikard et al. .............. | 226/95 |
| 5,531,313 A | | 7/1996 | Maass | |
| 5,695,043 A | | 12/1997 | Maezuru et al. | |
| 5,697,606 A | | 12/1997 | Maass | |
| 5,878,868 A | | 3/1999 | Gotoh et al. | |

FOREIGN PATENT DOCUMENTS

| | | |
|---|---|---|
| DE | 1075932 | 2/1960 |
| DE | 2636887 | 3/1977 |
| DE | 2657132 | 12/1977 |
| DE | 3919291 | 12/1989 |
| DE | 4416286 | 11/1995 |
| EP | 0465666 | 1/1992 |

* cited by examiner

Primary Examiner—Michael R. Mansen
(74) Attorney, Agent, or Firm—Greenblum & Bernstein, P.L.C.

(57) ABSTRACT

Vacuum conveyor and process for transporting at least a portion of a material web in a web travel direction. The vacuum conveyor includes two pulleys, a suction box positioned between the two pulleys, and an endless conveyor belt arranged around the two pulleys to form a loop. The suction box is positioned within the loop and the loop includes a conveyor run adapted to contact and guide the material web and a return run moving in a direction opposite the conveyor run. The suction box includes a suction opening positioned adjacent the conveyor run to suction the material web onto the conveyor belt and an exhaust opening positioned adjacent the return run. A vacuum source is coupled to the exhaust opening through the return run. The process includes creating a suction air flow from the vacuum source to the suction box through the return run of the conveyor belt, suctioning the at least a portion of the material web onto a conveying run of an endless conveyor with a suction box having a suction opening positioned adjacent at least a portion of the conveying run, and moving the endless conveyor to transport the at least a portion of the material web.

17 Claims, 2 Drawing Sheets

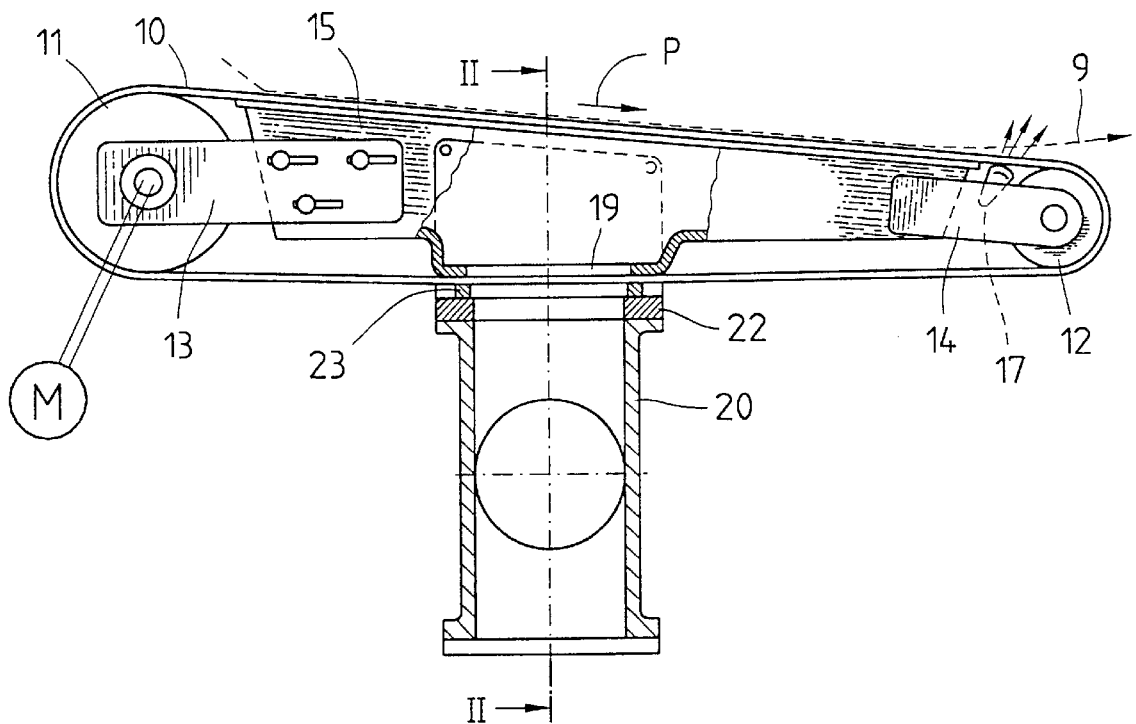
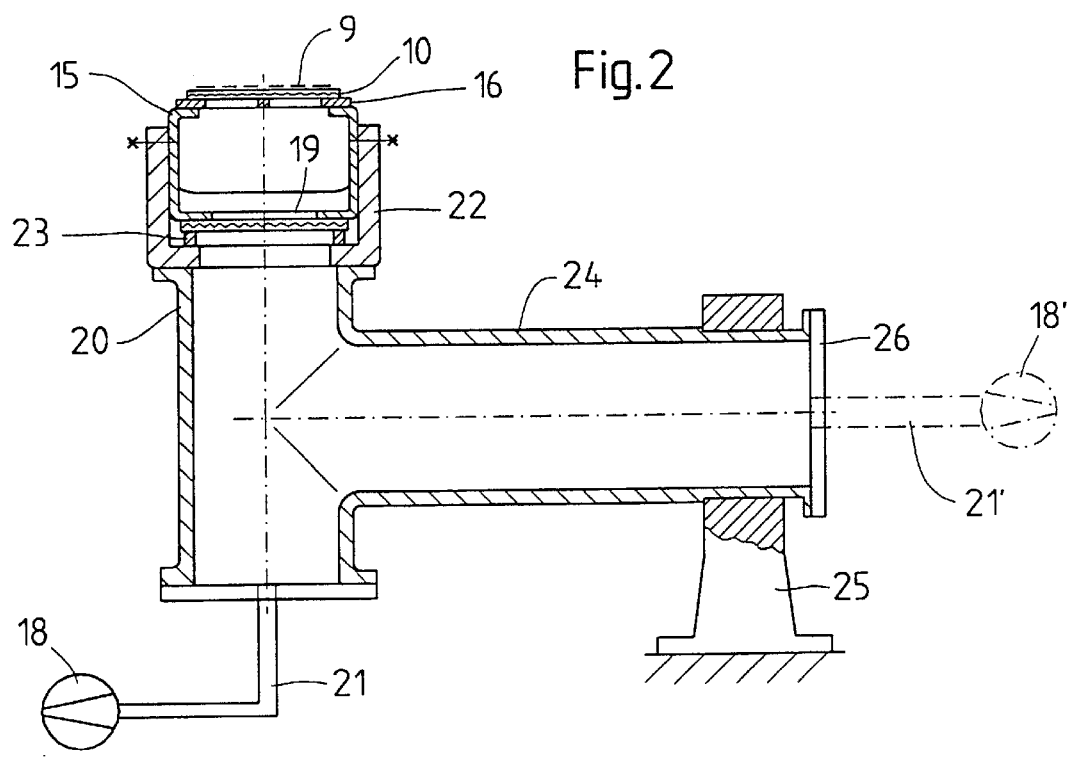

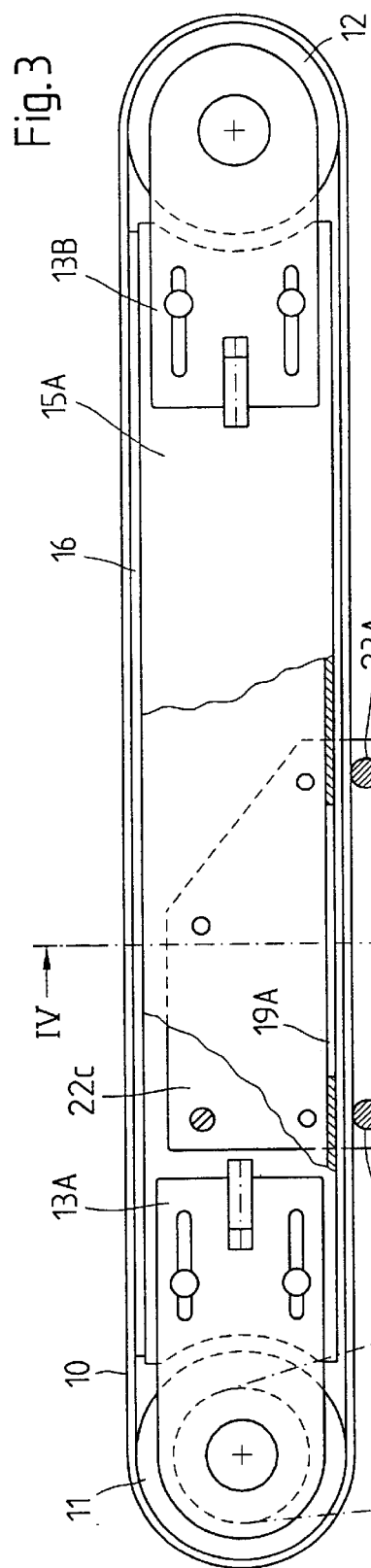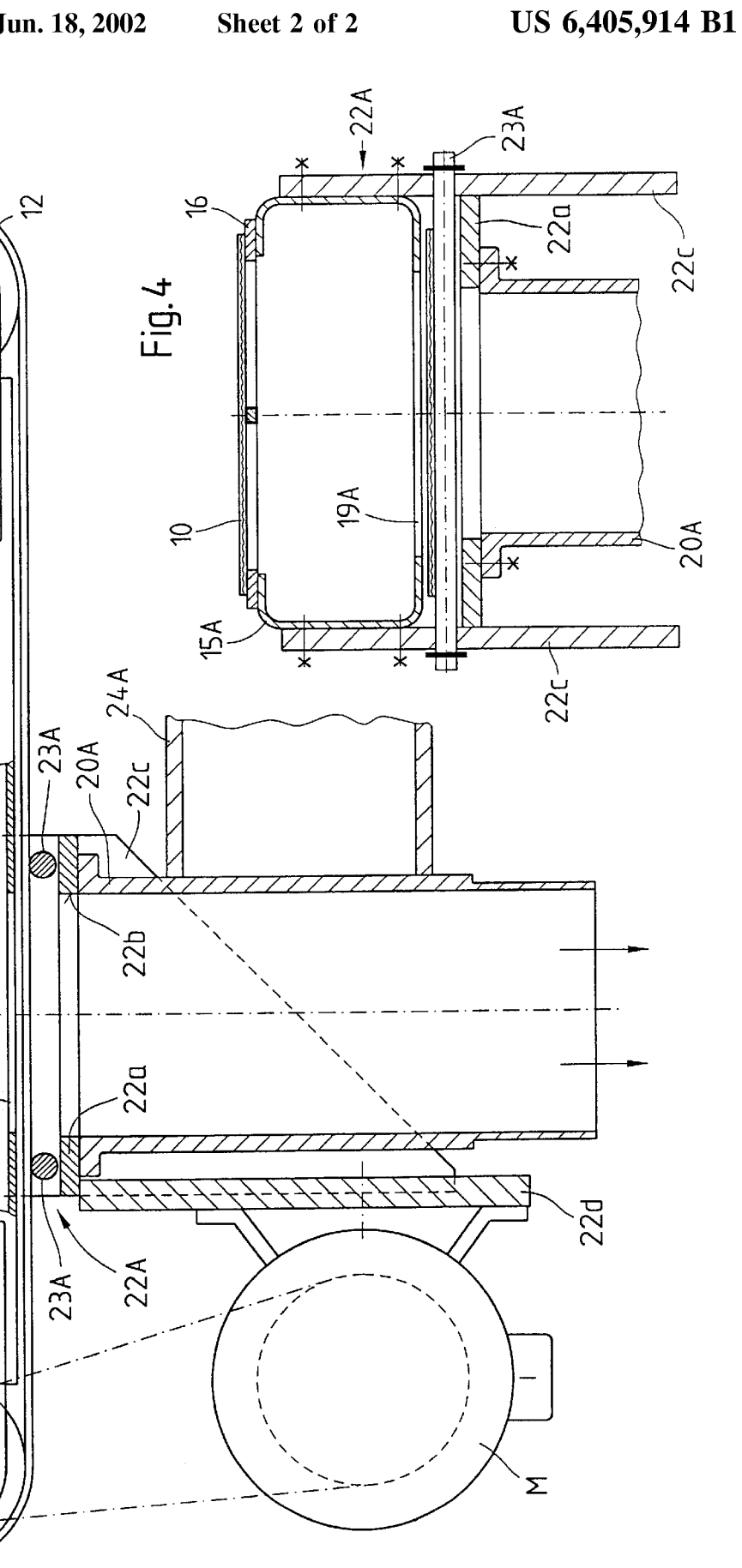

VACUUM CONVEYOR

CROSS-REFERENCE TO RELATED APPLICATIONS

The present application claims priority under 35 U.S.C. §119 of German Patent Application No. 299 10 850.3, filed on Jun. 25, 1999, the disclosure of which is expressly incorporated by reference herein in its entirety.

BACKGROUND OF THE INVENTION

1. Field of the Invention

The invention relates to a vacuum conveyor which is suitable for guiding a

2. Background of the Invention

Conveyors of the above-mentioned type, e.g., as disclosed in DE 26 36 887, have proven successful in operation. However, in many applications a disturbing factor is that with the known conveyor the connection for the vacuum pipe is arranged at one of the side walls of the suction box. Such an arrangement of the vacuum connection seems suitable because only the two side walls of the suction box are outwardly free, i.e., are accessible directly from outside. In most cases the two pulleys over which the endless conveyor belt runs, and the suction box located in between, fill the interior space of the endless conveyor belt almost completely.

SUMMARY OF THE INVENTION

Overall, there are several demands that should be fulfilled by a vacuum conveyor. For example, the vacuum conveyor should be suitable for as many different installation situations as possible and also be capable of being used in particularly restricted spaces. More precisely, the maximum construction width, including the vacuum connection, should, if possible, be only a little larger than the width of the web to be carried, especially the width of a threading tail, e.g., between approximately 0.1 and 0.4 m.

Moreover, the tendency for dirt particles or similar materials to collect during operation at the conveyor belt and/or in the suction box should be reduced.

The present invention provides a vacuum conveyor which meets as many of the above-stated demands as possible and which includes an air flow path, from the suction box to a vacuum source, that runs through a return run of the conveyor belt.

By drawing off the air by suction, i.e., for the purpose of generating a vacuum in the suction box, through the return run of the conveyor belt, the above-mentioned drawbacks can be resolved. Further, while the design work required for the vacuum connection is slightly greater than in previous vacuum conveyors, the instant invention achieves a considerable advantage in that the width of the vacuum connection requires no additional construction space over the width of the conveyor itself In this way, the conveyor can be more universally applicable than in the past, and even if only relatively little space is available, it is also more easily accessible than before.

A further advantage of the solution in accordance with the invention is that the air flow through the suction box and through the vacuum connection does not include any deflection to the side. This makes it possible for the air flow to remove any existing dirt particles from the conveyor more reliably than in the past. In particular, the tendency for dirt to collect inside the suction box is reduced, and the pores of the conveyor belt are kept free from dust deposits better than before. Thus, a continuous self-cleaning effect can be achieved.

In the area of the return run of the conveyor belt, a relatively large flow cross-section can be provided between the suction box and the external vacuum piping (e.g., in a so-called "suction nozzle"). Therefore, in accordance with the invention, it is possible to generate a higher vacuum than before in the suction box, without consuming more power.

A further characteristic feature of the vacuum conveyor of the invention is the supporting device which connects the suction box with the suction nozzle. In particular, it is noted that, according to the invention, the supporting device grips around the edges of the return run of the belt.

Various types of sealing elements may be used at an exhaust opening of the suction box and/or around the air flow path going through the supporting device.

While those sealing elements might be helpful to avoid an undesired inflow of secondary air into the suction nozzle, sliding friction could result from the sliding motion of the belt over the sealings. In order to resolve this problem, a small gap may be formed between the suction box and an inner side of the belt's return run. In this way, the gap can be free of any sealing elements. Moreover, two roll-type sealing elements which extend across the belt travel direction can be arranged between the supporting device and the belt's return run.

Further advantageous features of the invention include that the suction nozzle, without the suction pipe or together with the suction pipe, could perform a double function. In particular, it can be used both to exhaust the air and to carry the conveyor, i.e., to fasten the conveyor to a machine frame, rack or similar structure.

The present invention is directed to a vacuum conveyor for guiding at least a portion of a running web into a machine for one of producing, finishing, or processing the web. The vacuum conveyor includes two rotatably mounted pulleys, an air-previous endless conveyor belt tensioned over the two pulleys to form a loop including a conveying run and a return run, and a vacuum source. A suction box is located in the loop of the conveyor belt and is coupled to the vacuum source through an air flow path. In this way, a vacuum propagates through the conveying run to suction the web to be guided onto the conveyor belt. The air flow path is arranged to through the return run of the conveyor belt.

According to a feature of the instant invention, the at least a portion of the running web comprises a threading tail. Further, the web includes one of a paper and board web, and at least one of the two pulleys is a driven pulley.

Further, the suction box can include at least one exhaust opening which is open toward the return run, and the vacuum conveyor can further include a suction nozzle located outside of the loop of the conveyor belt which is open to the exhaust opening, and a vacuum pipe can be coupled to the suction nozzle. Further, a supporting device can be arranged to rigidly couple the suction nozzle and the suction box to each other. The supporting device may include a portion arranged to extend around edges of the return run.

Further, sliding elements may be arranged at at least one of the exhaust opening, the suction nozzle and the supporting device, so that the conveyor belt is arranged to slide over the sliding elements. The supporting device can include a plate arranged substantially parallel to the return run and can have an exhaust opening which at least approximately coincides with the exhaust opening of the suction box.

Sealing elements can be arranged at the supporting device between the plate and the return run. A gap can be formed between the suction box and an inner side of the return run, such that the gap is free of any sealing elements. The sealing elements arranged at the supporting device may include two rotatable sealing elements, each being formed as a cylindrical roll. The sealing elements may be arranged to extend cross-wise to the return run, and, relative to a travel direction of the return run, one of the sealing elements can be arranged in front of the exhaust opening of the supporting device and other of the sealing elements can be arranged after the exhaust opening.

The rotatable sealing elements may be arranged to allow contact between the sealing elements and an outside of the return run and to avoid contact between the sealing elements and the plate. The two rotating sealing elements can be the only sealing device arranged in a vicinity of the air-flow path from the suction box to the suction nozzle.

In accordance with another feature of the invention, the supporting device may include a support for a drive adapted to drive one of the two pulleys.

Further, the suction nozzle may include a portion of an assembly entirely supporting the vacuum conveyor. A part of the vacuum pipe, which connects the suction nozzle to the vacuum source, may be an integral part of the assembly supporting the vacuum conveyor.

The present invention is directed to a vacuum conveyor for transporting at least a portion of a material web in a web travel direction. The vacuum conveyor includes two pulleys, a suction box positioned between the two pulleys, and an endless conveyor belt arranged around the two pulleys to form a loop. The suction box is positioned within the loop and the loop includes a conveyor run adapted to contact and guide the material web and a return run moving in a direction opposite the conveyor run. The suction box includes a suction opening positioned adjacent the conveyor run to suction the material web onto the conveyor belt and an exhaust opening positioned adjacent the return run. A vacuum source is coupled to the exhaust opening through the return run.

According to a feature of the invention, a vacuum pipe can be coupled between the vacuum source and the exhaust opening, and a supporting device can be arranged to couple the suction box to the vacuum pipe. At least one rotatable sealing element may be provided, and the supporting device includes a rotatable sealing element holding portion to rotatably couple the at least one sealing element to the supporting device. The at least one rotatable sealing element can be positioned in contact with the return run. The vacuum conveyor can be adapted to convey a threading strip of the material web.

In accordance with another feature of the instant invention, a drive motor may be coupled to at least one of the two pulleys.

The present invention includes a process for conveying at least a portion of a material web with an apparatus that includes two rotatably mounted pulleys, an air-previous endless conveyor belt tensioned over the two pulleys to form a loop including a conveying run and a return run, a vacuum source, and a suction box located in the loop of the conveyor belt. The process includes creating a suction air flow from the vacuum source to the suction box through the return run of the conveyor belt, suctioning the at least a portion of the material web onto a conveying run of an endless conveyor with a suction box having a suction opening positioned adjacent at least a portion of the conveying run, and moving the endless conveyor to transport the at least a portion of the material web.

In accordance with a feature of the invention, the process can further include blowing the at least a portion of the material web away from the conveying run at an end of the conveying run.

According to another feature of the instant invention, the at least a portion of the material web can include a threading strip.

In accordance with yet another feature of the present invention, at least one of the two pulleys can be driven by a motor, thereby moving the conveyor belt.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 illustrates a cross-sectional side view of a vacuum conveyor in accordance with the features of the instant invention;

FIG. 2 illustrates a sectional view taken along the section line II—II depicted in FIG. 1;

FIG. 3 illustrates a cross-sectional side view of another embodiment of the vacuum conveyor of the present invention; and FIG. 4 illustrates a sectional view taken along section line IV depicted in FIG. 3.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The vacuum conveyor illustrated in FIGS. 1 and 2 is utilized to guide a running web, e.g., a paper or board web, and in particular, a threading tail 9, which is used for "threading" the web, e.g., inside a web making machine.

The conveyor includes an air-previous, endless conveyor belt 10, which is arranged to run over two pulleys 11 and 12 and over a suction box 15 located within the loop of endless conveyor belt 10. Pulleys 11 and 12 are rotatably mounted in holders 13 and 14, which are fastened to suction box 15. One of pulleys, e.g., pulley 11, is rotatably driven by a drive M, which is only schematically depicted in FIG. 1.

A conveying run of conveyor belt 10, which runs in the direction of web travel P, can be arranged as the upper run, however, an opposite arrangement is also possible. Suction box 15 has a cover plate 16 provided with slots (or similar openings). The conveying run of conveyor belt 10 is arranged to slide on plate 16 such that web 9 is sucked onto conveyor belt 10 and transported over the conveying run. At the end of the conveying run, an air blow nozzle 17 can be positioned to further guide web 9 from conveyor belt 10 to a subsequent downstream device.

Suction box 15 is coupled to a vacuum source 18 through an area of the return run (i.e., through the lower run in the exemplary embodiment) of conveyor belt 10. In this regard, suction box 15 includes a relatively large exhaust opening 19 or, e.g., a large number of exhaust slots. The return run of conveyor belt 10 can be arranged to slide over this part of suction box 15 or over sealing strip elements fitted to exhaust opening 19 (or the exhaust slots). Outside of the loop of conveyor belt 10, a suction nozzle 20 is arranged to open towards exhaust opening 19, and is connected to vacuum source 18 via a vacuum pipe 21. Thus, the vacuum propagates over suction nozzle 20 and through the return run of conveyor belt 10 to an interior of the suction box 15.

There are several possibilities for rigidly connecting suction nozzle 20 and suction box 15 to each other. For example, several supporting pins, which are anchored on the side walls of suction box 15 and on suction nozzle 20, can be utilized. Moreover, as shown in the exemplary embodiment, sealing strips 23 can be arranged at suction nozzle 20 so that conveyor belt 10 can be arranged to slide over sealing strips 23. The exemplary embodiment also includes a U-shaped supporting device 22, which can be arranged to grip around the edges of the return run of conveyor belt 10 (see, e.g., FIG. 2). The legs of supporting device 22 projecting upwardly in the exemplary embodiment, can be coupled to the side walls of suction box 15, e.g., with screws. The base of U-shaped supporting device 22 can include a large-area suction opening which is coupled to suction nozzle 20 and can be coupled to sealing elements, e.g., sealing strips 23, over which conveyor belt 10 slides. Via U-shaped supporting device 22, a very rigid connection can be made between suction nozzle 20 and suction box 15. In this manner, suction nozzle 20 can carry the entire vacuum conveyor, which enables the present invention to omit the customary supporting device of previous suction boxes (i.e., coupled to the sidewalls of the suction boxes). Moreover, a horizontal supporting arm 24 can be fastened to or molded on suction nozzle 20, and whose free end is clamped into a machine frame 25.

Pipe 21 leading to vacuum source 18 (as shown in full lines) can be connected directly underneath exhaust opening 19 to suction nozzle 20. Further, there is also a possibility (shown in dot-dash-lines) of connecting the vacuum source 18' via pipe 21' (e.g., at a flange 26) to supporting arm 24, if this is designed as a hollow carrier open to suction nozzle 20.

FIGS. 3 and 4 illustrate another embodiment of the instant invention which includes endless conveyor belt 10, two pulleys 11 and 12 (e.g., of equal size), holders 13A and 13B and a suction box 15A with a cover plate 16. A supporting device 22A is provided to couple suction box 15A with suction nozzle 20A, and includes a plate 22a and two side walls 22c. Plate 22a is arranged substantially parallel to belt 10 and includes an exhaust opening 22b. A base plate 22d can be coupled to supporting device 22A for mounting an electric motor M, e.g., for driving pulley 11.

A small gap between the bottom of suction box 15A and an inner side of the return run of conveyor belt 10 may be provided to be free of sealing elements. Preferably, sealing elements 23A are two rotatable cylindrical rolls extending cross-wise to the belt travel direction, which are arranged to contact an outside of conveyor belt 10 but to avoid contact with plate 22a.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A vacuum conveyor for guiding at least a portion of a running web into a machine for one of producing, finishing, or processing the web, comprising:

two rotatably mounted pulleys;

an air-pervious endless conveyor belt tensioned over said two pulleys to form a loop including a conveying run and return run;

a vacuum source; and a suction box located in the loop of said conveyor belt which is coupled to said vacuum source through an air flow path, such that a vacuum propagates through said conveying run to suction the web to be guided onto said conveyor belt, wherein said sir flow path is arranged through said return run of said conveyor belt, and wherein said suction box comprises has at least on exhaust opening which is open toward said return run, and said vacuum conveyor further comprising:

a suction nozzle located outside of the loop of said conveyor belt which is open to said at least one exhaust opening; and a vacuum pipe coupled to said suction nozzle.

2. The vacuum conveyor in accordance with claim 1, further comprising a supporting device arranged to rigidly couple said suction nozzle and said suction box to each other.

3. The vacuum conveyor in accordance with claim 2, wherein said supporting device includes a portion arranged to extend around edges of said return run.

4. The vacuum conveyor in accordance with claim 2, further comprising sliding elements arranged at at least one of said exhaust opening, said suction nozzle and said supporting device, wherein said conveyor belt is arranged to slide over said sliding elements.

5. The vacuum conveyor in accordance with claim 4, wherein said supporting device comprises a plate arranged substantially parallel to said return run and having an exhaust opening which at least approximately coincides with said exhaust opening of said suction box; and sealing elements are arranged at said supporting device between said plate and said return run.

6. The vacuum conveyor in accordance with claim 5, wherein a gap is formed between said suction box and an inner side of said return run, such that said gap is free of any sealing elements.

7. The vacuum conveyor in accordance with claim 5, wherein said sealing elements arranged at said supporting device comprises two rotatable sealing elements, each being formed as a cylindrical roll, wherein said sealing elements are arranged to extend cross-wise to said return run, and wherein, relative to a travel direction of said return run, one of said sealing elements is arranged in front of said exhaust opening of said supporting device and other of said sealing elements is arranged after said exhaust opening.

8. The vacuum conveyor in accordance with claim 7, wherein said rotatable sealing elements are arranged to allow contact between the sealing elements and an outside of said return run and to avoid contact between the sealing elements and said plate.

9. The vacuum conveyor in accordance with claim 7, wherein said two rotating sealing elements are the only sealing device arranged in a vicinity of said air-flow path from said suction box to said suction nozzle.

10. The vacuum conveyor in accordance with claim 2, wherein said supporting device comprises a support for a drive adapted to drive one of said two pulleys.

11. The vacuum conveyor in accordance with claim 1, wherein said suction nozzle comprises a portion of an assembly entirely supporting said vacuum conveyor.

12. The vacuum conveyor in accordance claim 11, wherein a part of said vacuum pipe, which connects said suction nozzle to said vacuum source, is an integral part of said assembly supporting said vacuum conveyor.

13. A vacuum conveyor for transporting at least a portion of a material web in a web travel direction, said vacuum conveyor comprising:

two pulleys;

a suction box positioned between said two pulleys;

an endless conveyor belt arranged around said two pulleys to form a loop, wherein said suction box is positioned within said loop and wherein said loop comprises a conveyor run adapted to contact and guide the material web and a return run moving in a direction opposite said conveyor run;

said suction box comprising a suction opening positioned adjacent said conveyor run to suction the material web onto said conveyor belt and an exhaust opening positioned adjacent said return run; and a vacuum source coupled to said exhaust opening through said return run.

14. The vacuum conveyor in accordance with claim 13, further comprising:

a vacuum pipe coupled between said vacuum source and said exhaust opening; and a supporting device arranged to couple said suction box to said vacuum pipe.

15. The vacuum conveyor in accordance with claim 14, further comprising at least one rotatable sealing element, wherein said supporting device comprises a rotatable sealing element holding portion to rotatably couple said at least one sealing element to said supporting device, and wherein said at least one rotatable sealing element is positioned in contact with said return run.

16. The vacuum conveyor in accordance with claim 15, wherein said vacuum conveyor is adapted to convey a threading strip of the material web.

17. The vacuum conveyor in accordance with claim 13, further comprising a drive motor coupled to at least one of said two pulleys.

* * * * *